United States Patent
Iwata et al.

(10) Patent No.: US 11,340,888 B2
(45) Date of Patent: May 24, 2022

(54) RELAY DEVICE AND EXTERNAL DEVICE

(71) Applicant: TOYOTA JIDOSHA KABUSHIKI KAISHA, Toyota (JP)

(72) Inventors: Atsushi Iwata, Nagakute (JP); Akiteru Takae, Okazaki (JP); Nobuyuki Nakagawa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 120 days.

(21) Appl. No.: 17/023,873

(22) Filed: Sep. 17, 2020

(65) Prior Publication Data
US 2021/0096841 A1   Apr. 1, 2021

(30) Foreign Application Priority Data

Sep. 30, 2019   (JP) .............................. JP2019-179780

(51) Int. Cl.
*G06F 8/65*  (2018.01)
*B60R 16/023* (2006.01)
*G06F 13/40* (2006.01)

(52) U.S. Cl.
CPC .............. *G06F 8/65* (2013.01); *B60R 16/023* (2013.01); *G06F 13/4027* (2013.01)

(58) Field of Classification Search
USPC ....................................................... 717/172
See application file for complete search history.

(56) References Cited

U.S. PATENT DOCUMENTS

| | | | |
|---|---|---|---|
| 10,552,143 B2 * | 2/2020 | Nakano | B60R 16/02 |
| 2017/0192770 A1 * | 7/2017 | Ujiie | G06F 8/654 |
| 2018/0048473 A1 * | 2/2018 | Miller | H04L 9/14 |
| 2019/0050219 A1 | 2/2019 | Seki | |
| 2019/0235855 A1 | 8/2019 | Nakano | |
| 2019/0268420 A1 * | 8/2019 | Acharya | G06F 8/658 |
| 2020/0050442 A1 * | 2/2020 | Sakurai | H04L 67/12 |
| 2021/0157492 A1 * | 5/2021 | Harata | G06F 8/65 |
| 2022/0038307 A1 * | 2/2022 | Yasunori | H04L 12/46 |

FOREIGN PATENT DOCUMENTS

| | | |
|---|---|---|
| JP | 2017-157003 A | 9/2017 |
| JP | 2017-215890 A | 12/2017 |
| JP | 2018-181376 A | 11/2018 |
| JP | 2018-181377 A | 11/2018 |
| WO | 2014/122711 A1 | 8/2014 |
| WO | 2019/004173 A1 | 1/2019 |

* cited by examiner

*Primary Examiner* — Qing Chen
*Assistant Examiner* — Clint Thatcher
(74) *Attorney, Agent, or Firm* — Oliff PLC

(57) ABSTRACT

The relay device transmits data for writing or updating a program received from the external communication bus to an in-vehicle communication bus, which is the transfer destination, in order of reception of the data. A storage area for temporary storage can be smaller and costs can be reduced, as compared with a case where the data is stored until all data is prepared for each of in-vehicle devices. Further, the required time can be reduced as compared with a case where all data is received for each of the in-vehicle devices and then transmitted to the in-vehicle devices. The external device transmits data addressed to the in-vehicle devices to the relay device in parallel.

11 Claims, 11 Drawing Sheets

RELAY DEVICE AND EXTERNAL DEVICE

CROSS-REFERENCE TO RELATED APPLICATION

This application claims priority to Japanese Patent Application No. 2019-179780 filed on Sep. 30, 2019, incorporated herein by reference in its entirety.

BACKGROUND

1. Technical Field

The present disclosure relates to a relay device and an external device included in a network system mounted on a vehicle or the like.

2. Description of Related Art

A vehicle is equipped with a network system in which a plurality of in-vehicle devices called electronic control units (ECUs) are connected to each other via a bus. Each of the in-vehicle devices transmits and receives messages to and from each other via the bus, and executes functions of the vehicle in a shared manner. The network system typically includes a plurality of buses, and a relay device, referred to as gateway, relays communication between different buses.

The in-vehicle device typically includes a processor and a temporary storage unit such as a RAM and a non-volatile storage unit such as a flash ROM. The program executed by the processor is stored in the non-volatile storage unit. For example, such a program may be newly written in the storage unit when the vehicle is manufactured at the factory, or the program already written in the storage unit may be rewritten or updated as a newer version at a service station upon inspection after shipping the vehicle.

JP-A-2018-181377 discloses that a relay device receives an update program for a plurality of in-vehicle devices by wireless communication and transmits the update program to each of the in-vehicle devices. The relay device disclosed in JP-A-2018-181377 transmits update programs of the in-vehicle devices connected to different buses to respective buses simultaneously and in parallel, thereby improving the efficiency and shortening a time required for updating as compared to a case where each update program is transmitted one by one.

SUMMARY

As it is necessary for the relay device disclosed in JP A 2018-181377 to temporarily store each update program for each of the in-vehicle devices in an internal storage device, costs are incurred for preparing many storage areas. Further, the relay device receives and stores the update programs, and then transmits the update programs to each of the in-vehicle devices, thus the total required time is equal to or greater than the sum of the respective process times, and efficiency is limited.

The present disclosure is intended to address such shortcomings, and an objective of the present disclosure is to provide a relay device and an external device, each of which is capable of efficiently writing and updating a program for an in-vehicle device.

In order to address such shortcomings, one aspect of the present disclosure is a relay device configured to be connected to an external communication bus of a vehicle and to a plurality of in-vehicle communication buses to each of which one and more in-vehicle device is connectable. The relay device includes an external communication unit configured to communicate with an external device via the external communication bus, an in-vehicle communication unit configured to communicate with the in-vehicle device connected to each of the in-vehicle communication buses via the in-vehicle communication bus, and a control unit configured to control the external communication unit and the in-vehicle communication unit. The external communication unit is configured to sequentially receive information for newly writing or updating a program of one of the in-vehicle devices, as a data sequence divided in a predetermined unit, or alternatively, sequentially receive pieces of information for newly writing or updating each of programs of the in-vehicle devices, each of which is a data sequence divided in a predetermined unit and time-division multiplexed, from the external device, and the control unit is configured to control the in-vehicle communication unit such that the in-vehicle communication unit specifies the in-vehicle communication bus to be a transfer destination of the data in order in which the data is received by the external communication unit, converts the data according to a protocol corresponding to the in-vehicle communication bus which is the transfer destination, and sequentially transmit the converted data to the in-vehicle communication bus which is the transfer destination in order of conversion.

In order to address the above-described shortcomings, another aspect of the present disclosure is an external device that transmits, to a relay device connected to an external communication bus and a plurality of in-vehicle communication buses to each of which one or more in-vehicle devices are connected, information for newly writing or updating a program of one of the in-vehicle devices, via the in-vehicle communication bus. The external device includes a communication unit configured to communicate with the relay device, and a control unit configured to control the communication unit. The control unit is configured to execute first transmission control in which a data transmission process for controlling the communication unit is executed in parallel for the in-vehicle devices connected to different in-vehicle communication buses in order to time-division multiplex and transmit a plurality of data sequences, and to execute second transmission control in which the data transmission process is executed for one of the in-vehicle devices. The data transmission process controls the communication unit such that the communication unit sequentially transmits, to the relay device, the information for newly writing or updating the program of the in-vehicle device as the data sequence divided in a predetermined unit.

According to the present disclosure, it is possible to provide a relay device and an external device, each of which is capable of efficiently writing and updating a program for an in-vehicle device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The relay device according to the present disclosure transmits data obtained by dividing information for writing or updating a program received from the external communication bus to the in-vehicle communication bus, which is the transfer destination, in order of reception. Consequently, as compared with a case where the data is stored until all data is prepared for each of in-vehicle devices, the size of a storage area for temporary storage and costs can be reduced. Further, the required time can be reduced as compared with a case where all data is received for each of the in-vehicle devices and then transmitted to the in-vehicle devices. Further, the external device according to the present disclosure can transmit, to the relay device, the information addressed to the in-vehicle devices in parallel as a data sequence in which the information is time-division multiplexed and mixed. The relay device receives such a data sequence from the external communication bus, and distributes and transfers the data sequence for each of the in-vehicle communication buses to each of which the in-vehicle device, which is the destination, is connected. Therefore, the data communication speed of the external communication bus can be faster than the data communication speed of each of the in-vehicle communication buses, and thus the required time can be further reduced. Next, each embodiment of the present disclosure will be described.

First Embodiment

Configuration

Figure 1:
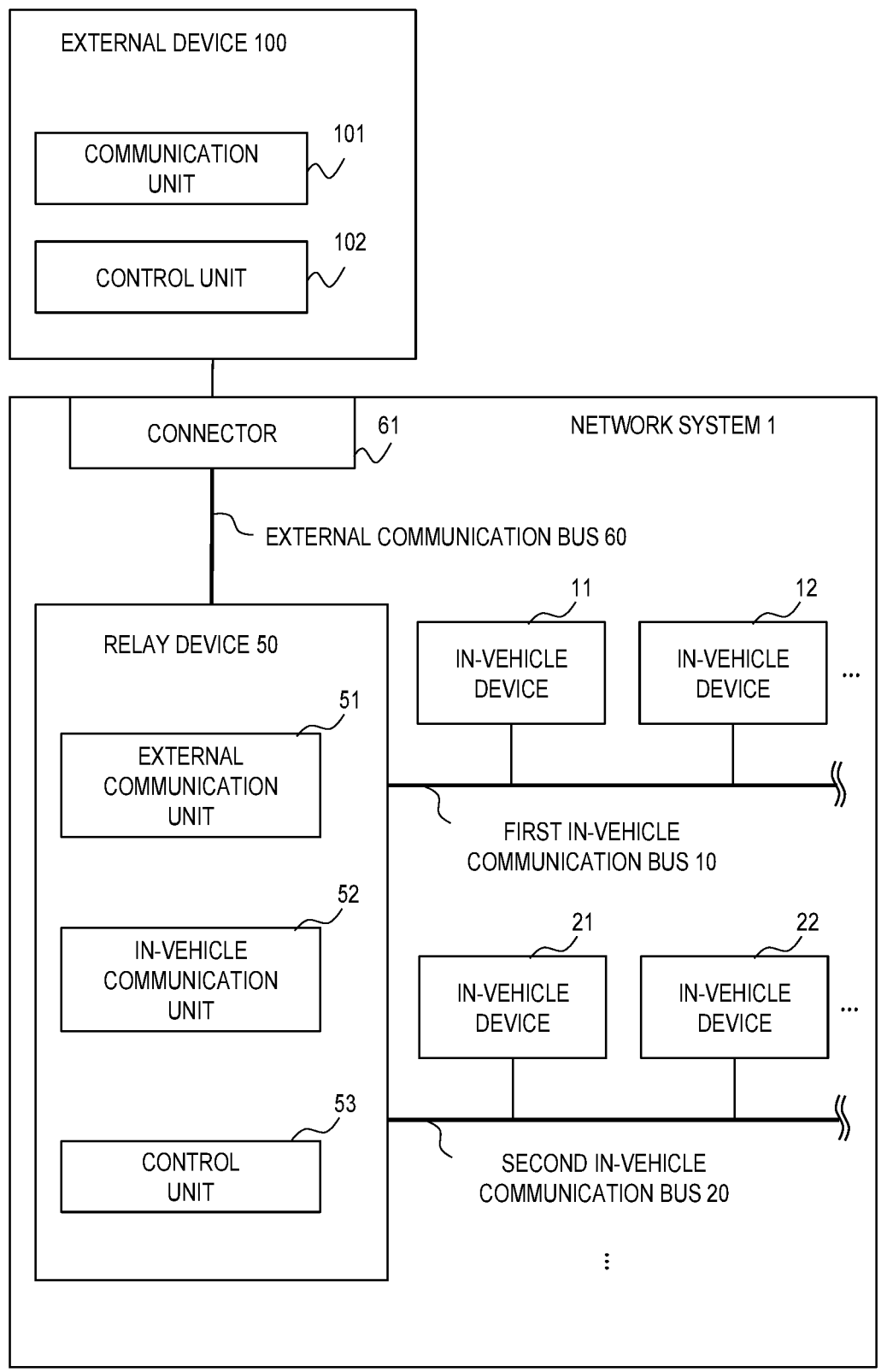
FIG. 1 is a conceptual diagram of a network system according to first to third embodiments of the present disclosure.

FIG. 1 is a conceptual diagram of a network system 1 according to the present embodiment. The network system 1 is mounted on a vehicle as one example. The network system 1 includes a relay device 50. The relay device 50 is connected to a plurality of in-vehicle communication buses 10, 20, . . . and an external communication bus 60. Further, in-vehicle devices 11, 12, 21, 22, . . . are connected to any of the in-vehicle communication buses 10, 20, . . . . In FIG. 1 and the following description, a first in-vehicle communication bus 10 and a second in-vehicle communication bus 20 are illustrated as the in-vehicle communication buses, and the in-vehicle devices 11 and 12 connected to the first in-vehicle communication bus 10 are illustrated as the in-vehicle devices. The in-vehicle devices 21 and 22 are connected to the second in-vehicle communication bus 20. An external communication bus 60 can be connected to an external device 100 via a connector 61.

The relay device 50 has a function of relaying communication between the external device 100 and each of the in-vehicle devices 11, 12, 21, and 22, and relaying communication between the in-vehicle devices via the buses. The relay device 50 includes an external communication unit 51 that performs communication via the external communication bus 60, an in-vehicle communication unit 52 that performs communication via the in-vehicle communication buses 10 and 20, and a control unit 53 that controls the above units.

The in-vehicle devices 11, 12, 21, and 22 communicate with each other and execute various processes for controlling the vehicle. These in-vehicle devices include a non-volatile storage unit such as a flash ROM, a control unit that executes various processes by reading and executing a program from the non-volatile storage unit, and a temporary storage unit such as a RAM that stores a part of the program and data. The relay device 50 similarly includes a non-volatile storage unit that stores the program, and a control unit 53 can execute processes by reading and executing the program.

The external device 100 may be, for example, a terminal device used by a worker having predetermined authority. By connecting to the connector 61, the external device 100 can provide, through wired communication, the relay device 50 with a program to be stored in the storage unit of each of the in-vehicle devices 11, 12, 21, and 22. The external device 100 includes a communication unit 101 that communicates with the relay device 50, and a control unit 102 that controls the communication unit 101. Further, the external device 100 may include a storage unit that receives and temporarily stores the program provided to each of the in-vehicle devices from another device.

The external device 100, for example, may newly write the program in the storage unit when the vehicle is manufactured at the factory, or rewrite the updated version of the program over the program already written in the storage unit at a service station upon inspection after shipping the vehicle. The external device 100 may be a server installed at a predetermined service center outside the vehicle instead of the terminal device. In this case, the relay device 50 connects to a wireless communication device provided in the vehicle via the external communication bus 60, and the external device 100 can provide the program to the relay device 50 by wireless communication via the wireless communication device.

Sequence

Figure 2:
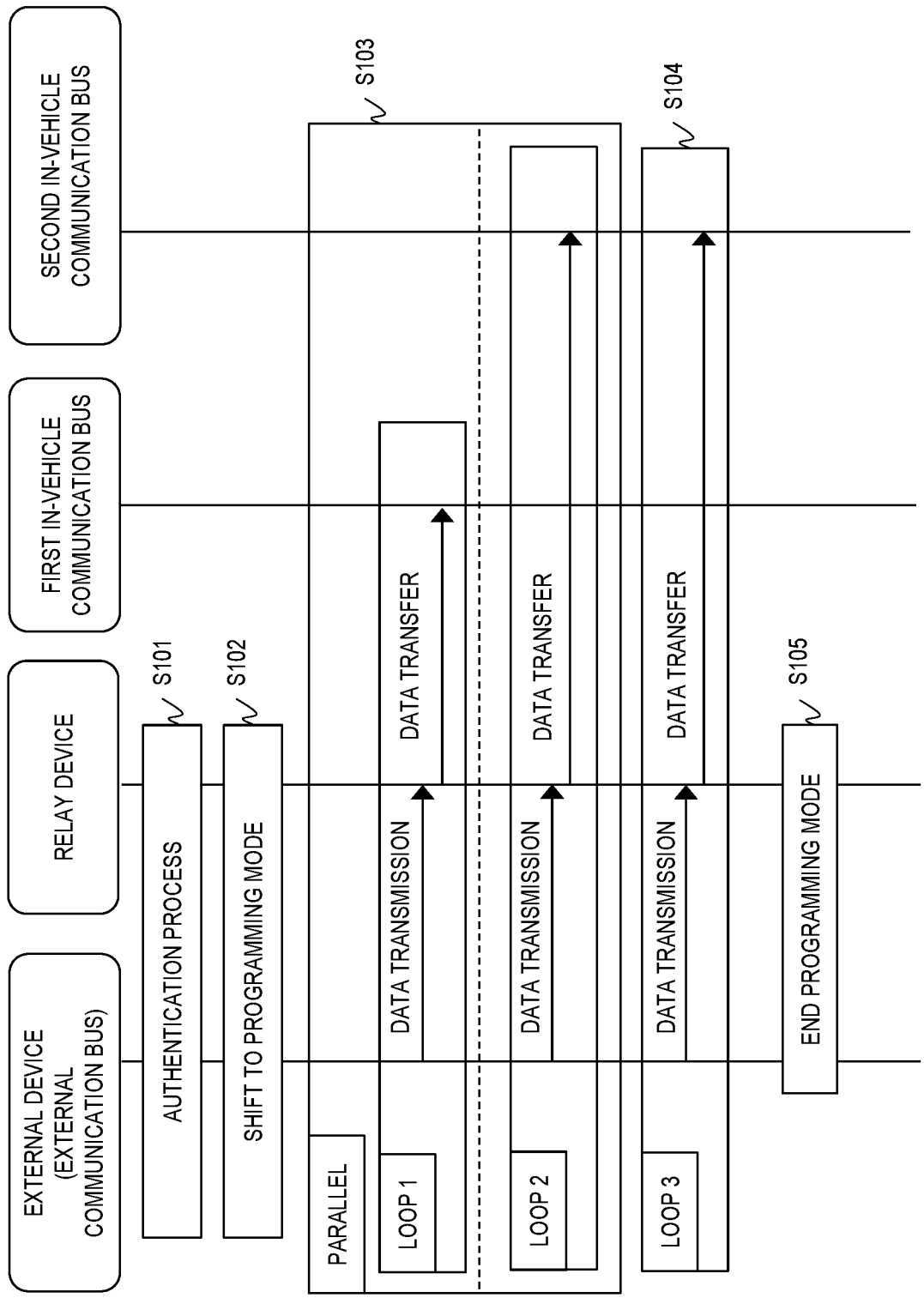
FIG. 2 is a sequence diagram illustrating a process according to the first embodiment of the present disclosure.

Hereinafter, a process of newly writing or updating a program according to the present embodiment will be described. Here, both processes are collectively called programming. FIG. 2 shows a sequence diagram of this process.

(Step S101): When the external device 100 and the relay device 50 are communicable, an authentication process is executed. In this step, the relay device 50 authenticates the external device 100 as a legitimate device by, for example, a challenge-response scheme. If the authentication fails, the subsequent process is not executed.

(Step S102): The external device 100 and the relay device 50 shift to a programming mode capable of executing programming for the in-vehicle devices in parallel or for the single in-vehicle device.

(Step S103): In the present embodiment, programming of the plurality of in-vehicle devices connected to respective in-vehicle communication buses can be executed in parallel (parallel programming). In this step, as an example, programming for the single in-vehicle device connected to the first in-vehicle communication bus 10 (loop L1) and programming for the single in-vehicle device connected to the second in-vehicle communication bus 20 (loop L2) are executed in parallel. If the in-vehicle communication buses are three or more, such loops may be executed in parallel according to the number of in-vehicle communication buses, and the in-vehicle devices connected to the three or more in-vehicle communication buses may be programmed in parallel.

The loop L1 will be described hereinbelow. The external device 100 transmits the information for programming the single in-vehicle device connected to the first in-vehicle communication bus 10. This information is a program or a compressed version of the program. Alternatively, in a case of updating, the information representing a difference between the program before update and the program after update, or information obtained by compressing such information may be used. This information is divided according to the communication protocol of the external communication bus 60, and is sequentially transmitted as a data sequence in frame units to which additional information such as a header is appropriately added. The relay device 50 receives the data via the external communication bus 60, and transfers the data by sequentially transmitting the data to the first in-vehicle communication bus 10. When transferring the data, the relay device 50 converts a data format according to the communication protocol of the first in-vehicle communication bus 10, if needed.

The loop L2 will be described hereinbelow. The external device 100 transmits the information for programming the single in-vehicle device connected to the second in-vehicle communication bus 20 which is different from the first in-vehicle communication bus 10. This information is, similarly to the loop L1, a program, difference information, or a compressed version thereof. This information is divided according to the communication protocol of the external communication bus 60 and is sequentially transmitted as a data sequence in frame units to which a header is appropriately added, similarly to the loop L1. The relay device 50 receives the data via the external communication bus 60, and transfers the data by sequentially transmitting the data to the second in-vehicle communication bus 20. When transferring the data, the relay device 50 converts a data format according to the communication protocol of the second in-vehicle communication bus 20, if needed.

In this step, the relay device 50 transmits the data received from the external communication bus 60 to any one of the in-vehicle communication buses 10 and 20 in the order in which the data is received. Thus, compared with a case where the data is stored until all data is prepared for each of the in-vehicle devices, the size of the storage area for temporary storage can be reduced, and the cost can also be reduced. Further, the required time can be reduced as compared with a case where all data is received for each of the in-vehicle devices and then transmitted to the in-vehicle device.

As a result of the loops L1 and L2 being executed in parallel, the data transmitted in each loop is mixed in the data sequence transmitted by the external device 100. Therefore, the relay device 50 receives the data sequence from the external communication bus 60 in a form in which the data addressed to the in-vehicle devices is almost uniformly mixed. Each piece of data included in this data sequence is distributed and transferred by the relay device 50 to any one of the in-vehicle communication buses 10 and 20 according to the destination. That is, the data sequence transmitted to each of the in-vehicle communication buses 10 and 20 is intermittently extracted from the data sequence received from the external communication bus 60. Therefore, even if the data communication speed of the external communication bus 60 is higher than the data communication speed of each of the in-vehicle communication buses 10 and 20 by a certain degree, the relay device 50 can transfer the received data without waiting for transmission due to the slower data communication speed of each of the in-vehicle communication buses 10 and 20. As described above, in this step, it is preferable that the data communication speed of the external communication bus 60 be higher than the data communication speed of each of the in-vehicle communication buses 10 and 20, thus the required time can be further reduced. The data communication speed of the external communication bus 60 can be set appropriately based on the number of in-vehicle devices to be programmed in parallel, the mixing ratio of data, the communication speed of each in-vehicle communication bus, the data processing speed of each in-vehicle device, the data transfer processing speed of the relay device 50, and the like.

In the present embodiment, when there is a set of the in-vehicle devices connected to different in-vehicle communication buses among the in-vehicle devices to be programmed, the programming of the set is preferentially executed in parallel in this step. It is preferable because the required time can be further reduced.

(Step S104): In this step, the single in-vehicle device is programmed. In the illustrated example, the single in-vehicle device connected to the second in-vehicle communication bus 20 is programmed as an example. This process (loop L3) is the same as the process of loop L2 described above. In the present embodiment, for example, programming of the in-vehicle devices connected to the same in-vehicle communication bus is not executed in parallel. In a case where the plurality of in-vehicle devices are connected to the same in-vehicle communication bus, a bottleneck occurs in the communication speed of the in-vehicle communication bus even if the programming is executed in parallel, which is the same as a case where the programming is executed for each in-vehicle device (this is because the required time depends on the communication speed of the in-vehicle communication bus), and thus the required time is hardly reduced. Furthermore, if the programming is executed in parallel in the same in-vehicle communication bus, the traffic of the in-vehicle communication bus will increase, resulting in a communication bottleneck, whereby the in-vehicle device programming may not be completed normally. Additionally, in a case where the in-vehicle communication bus to which the in-vehicle device is connected is not specified, the programming is executed in this step. In this case, the relay device 50 transmits the data to both of the in-vehicle communication buses 10 and 20.

In the present embodiment, among the in-vehicle devices to be programmed, if there is a pair of in-vehicle devices to be programmed which are connected to different busses step S103 is repeated, and if there is not a pair of in-vehicle devices to be programmed, step S104 is repeated.

(Step S105): The external device 100 and the relay device 50 terminate the programming mode when the in-vehicle devices to be programmed are completely programmed.

Process of External Device

Figure 3:
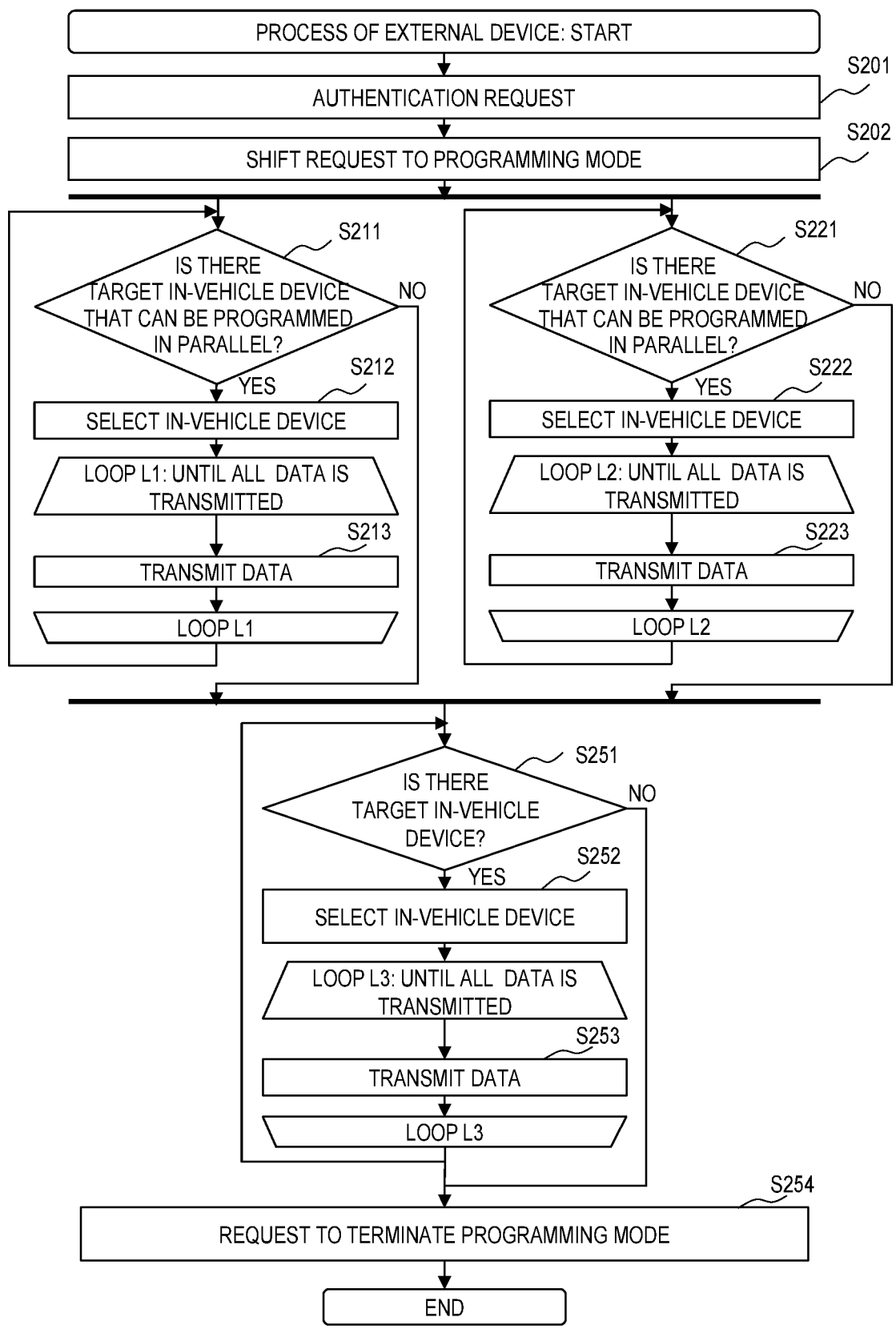
FIG. 3 is a flowchart illustrating a process according to the first embodiment of the present disclosure.

The process of the external device 100 in the sequence stated above will be described below. FIG. 3 shows a flowchart of this process.

(Step S201): The control unit 102 of the external device 100 controls the communication unit 101 to communicate with the relay device 50, requests authentication of the external device 100 by the relay device 50, and then receives the authentication from the relay device 50.

(Step S202): The control unit 102 controls the communication unit 101 to communicate with the relay device 50 and issue a shift request to the programming mode, and also shifts the external device 100 to the programming mode.

After shifting to the programming mode, the subsequent process of steps S211 to S213 and the process of steps S221 to S223 are executed in parallel (first transmission control). The processes can be executed in parallel, for example, by a fork process in which the control unit 102 newly generates a process execution unit called a "process".

(Step S211): The control unit 102 determines whether there is an in-vehicle device that can be programmed in parallel. How this is determined will be described later. If there is an in-vehicle device that can be programmed in parallel, the process proceeds to step S212. If there is no in-vehicle device that can be programmed in parallel, the process proceeds to step S251 after completion of the other "processes" such as step S221 to S223 described later.

(Step S212): The control unit 102 selects one in-vehicle device that can be programmed in parallel.

(Step S213): The control unit 102 causes the communication unit 101 to sequentially transmit information necessary for programming of the in-vehicle device selected in step S212 as a data sequence. The control unit 102 adds, to the data as additional information, an ID (identifier) that can specify the in-vehicle device to be the destination. The control unit 102 repeats this process until all the information is transmitted. Thereafter, the process proceeds to step S211.

(Steps S221 to S223): The control unit 102 newly generates a "process", and executes the same process as steps S211 to S213 stated above in this "process". However, if there is no in-vehicle device that can be programmed in parallel in step S221, the control unit 102 ends this "process", and executes the following step S251 and subsequent steps as the "process" continued from step S211 stated above.

In steps S211 and S212 or steps S221 and S222, the determination as to whether there is an in-vehicle device that can be programmed in parallel and selection of the in-vehicle device, can be performed based on, for example, predetermined information. In this case, the information may include, for example, information representing update procedure that specifies the order of programming for each in-vehicle device or a combination thereof, which is suitably determined so as to enable programming in parallel. In each of the processes stated above, the control unit 102 can execute determination and selection according to this information.

Alternatively, the predetermined information may include information specifying the in-vehicle device to be programmed and the in-vehicle communication bus to which such an in-vehicle device is connected. If there is such information, it is shared by the external device 100 and the relay device 50. In this case, for example, when there is an in-vehicle device for which programming has not been started and there is no other in-vehicle device currently programmed on the in-vehicle communication bus to which the former in-vehicle device is connected, the control unit 102 can select the in-vehicle device for which programming has not been started by determining that parallel programming is available.

Even if steps S213 and S223 are executed in parallel, the communication unit 101 time-divides a communication period for data transmitted in each step and appropriately multiplexes each data sequence, so that the data sequences transmitted in each step do not interfere with each other.

Further, three or more "processes" may be executed in parallel. The number of "processes" can be determined according to, for example, the processing capacity of the control unit 102 or the communication unit 101 of the external device 100, or the number of in-vehicle communication buses of the network system 1. Further, as long as they can be executed in parallel, the implementation form of the processing unit is not limited to this "process".

(Step S251): The control unit 102 determines whether there is an in-vehicle device to be programmed. If there is an in-vehicle device, from among the in-vehicle devices to be programmed, that has not been programmed in the parallel process stated above the process proceeds to step S252. Otherwise, the process proceeds to step S254.

(Step S252): The control unit 102 selects one in-vehicle device that can be programmed. The determination and the selection in step S251 can also be performed based on the predetermined information as described above. The in-vehicle device selected in this step is an in-vehicle device that cannot be programmed in parallel, but, among the in-vehicle devices that cannot be programmed, there may be included an in-vehicle device for which it is unknown which in-vehicle communication bus such an in-vehicle device is connected to and thus the determination whether or not such an in-vehicle device can be programmed in parallel is unavailable.

(Step S253): The control unit 102 causes the communication unit 101 to sequentially transmit the information necessary for programming of the in-vehicle device selected in step S212, similar to as stated above, as the data sequence to which the ID is added (second transmission control). This data sequence is transferred to any one of the in-vehicle communication buses. In a case where the data communication speed of the external communication bus 60 is faster than the data communication speed of each in-vehicle communication bus, as one method used in order to delay the data transmission, the transmission may be interrupted after transmitting predetermined pieces of data, and the transmission may be restarted when the response is received from the in-vehicle device, which is the destination, via the relay device 50. In this case, after receiving the predetermined pieces of data, the in-vehicle device is allowed to transmit the response that represents that new data can be received. Alternatively, in the second transmission control of this step, as another method, the data communication speed of the external communication bus 60 is reduced, in comparison with the first transmission control as stated above, to be the same as the data communication speed of each in-vehicle communication bus. The control unit 102 repeats this process until all the information is transmitted.

(Step S254): The control unit 102 controls the communication unit 101 to communicate with the relay device 50 and issue a request to terminate the programming mode, and also terminates the programming mode of the external device 100.

Process of Relay Device

Figure 4:
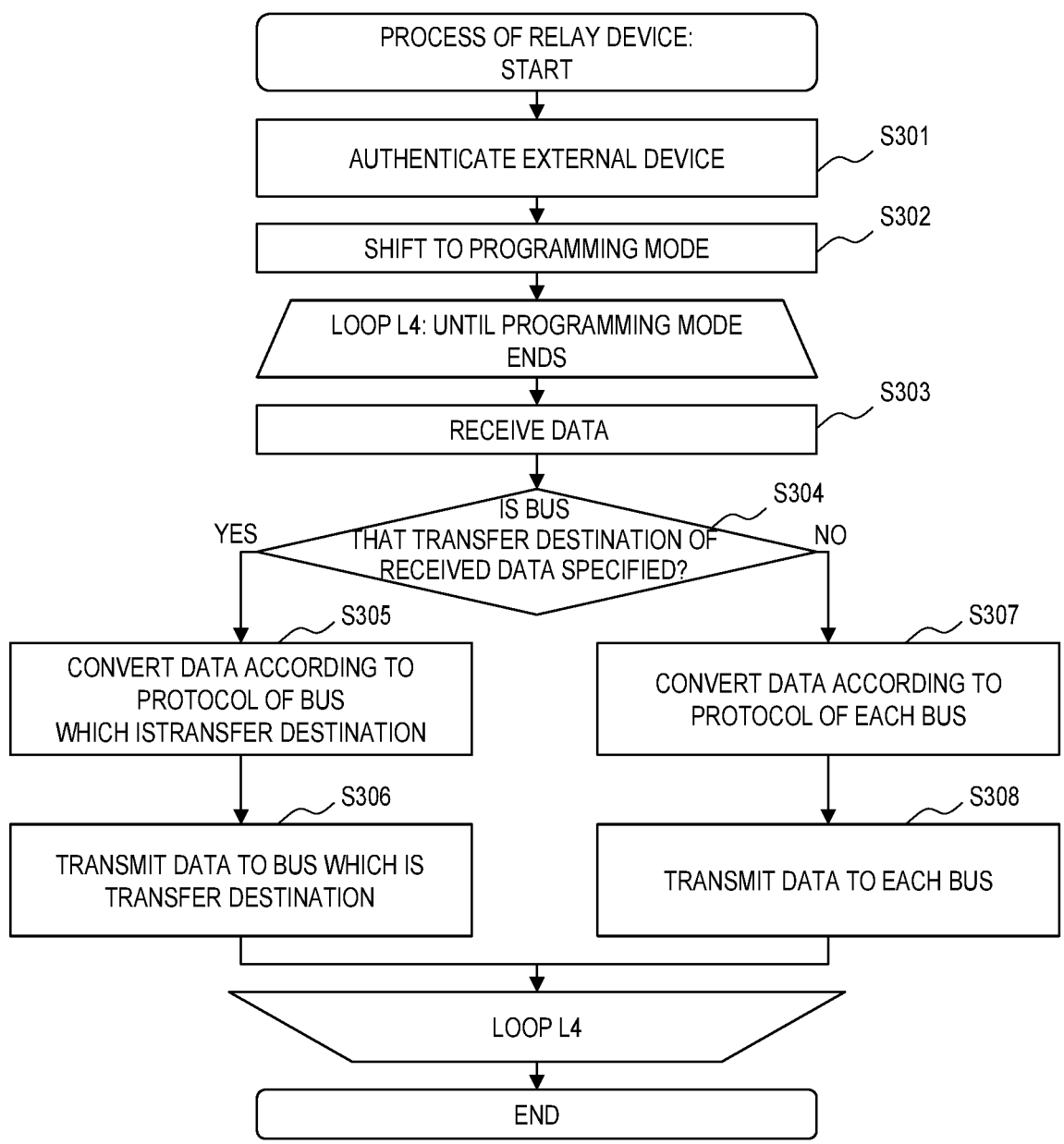
FIG. 4 is a flowchart illustrating a process according to the first embodiment of the present disclosure.

The process of the relay device 50 in the sequence stated above will be described below. FIG. 4 shows a flowchart of this process.

(Step S301): The control unit 53 of the relay device 50 controls the external communication unit 51 to communicate with the external device 100, and authenticates the external device 100 in response to the authentication request from the external device 100.

(Step S302): The control unit 53 shifts to the programming mode in response to the request to shift to the programming mode from the external device 100.

(Step S303): The external communication unit 51 receives the data for programming the in-vehicle device from the external device 100. Alternatively, the in-vehicle communication unit 52 receives programming response communication from the in-vehicle devices 11, 12, 21, 22, . . . .

(Step S304): Based on the ID added to the data received in step S303, in a case where it is determined that the data destination is the in-vehicle device, the control unit 53 specifies the in-vehicle communication bus to which such an in-vehicle device is connected as the bus that is the transfer destination, and in a case where it is determined that the data destination is the external device 100, specifies the external communication bus to be the transfer destination bus. If the transfer destination bus can be specified, the process proceeds to step S305. Otherwise, the process proceeds to step S307.

(Step S305): The control unit 53 converts, into data for transmission, a format of the data received in step S303 according to the communication protocol of the in-vehicle communication bus or the external communication bus, which is the transfer destination. The data conversion may include replacing the additional information, changing the format, combining the received data of multiple frames into data of a single frame, and dividing the received data of the single frame into data of multiple frames. For example, in a case where the external communication bus 60 and the in-vehicle communication bus that is the transfer destination use the same communication protocol, the received data is not converted and used as the data for transmission without changing.

(Step S306): The control unit 53 controls the in-vehicle communication unit 52 or the external communication unit 51 to transmit the data for transmission to the in-vehicle communication bus or the external communication bus, which is the transfer destination. Thereafter, the process proceeds to step S303.

(Step S307): The control unit 53 converts, into data for transmission, a format of the data received in step S303 according to the respective communication protocols of the in-vehicle communication buses 10 and 20 and the external communication bus 60. The data conversion is executed in the same manner as in step S305 described above. For example, in a case where the received data uses the same communication protocol as that of the bus that is the transfer destination, the received data is not converted and used as the data for transmission without changing for such a transfer destination.

(Step S308): The control unit 53 controls the in-vehicle communication unit 52 and the external communication unit 51 to respectively transmit the data for transmission to the in-vehicle communication bus and the external communication bus, which is the transfer destination. In this step, the data is transmitted to the in-vehicle communication buses 10 and 20, and the external communication bus, thus the data can be transferred to the in-vehicle device which is connected to any one of the in-vehicle communication buses which is the transfer destination of the data. Steps S307 and S308 are executed, for example, in a case where the in-vehicle communication bus to which the in-vehicle device of the data destination is connected cannot be specified in step S304. Such an in-vehicle device is not determined to be programmable in parallel. Therefore, since such data is the data transmitted in step S253 stated above, the in-vehicle devices are not being programmed in parallel when this step is executed. Therefore, even if the data is transmitted to both of the in-vehicle communication buses 10 and 20, the programming of other in-vehicle devices is not affected. Thereafter, the process proceeds to step S303.

The processes of steps S303 to S308 are repeated while the relay device 50 is in the programming mode. The control unit 53 terminates the programming mode in a case where the external communication unit 51 receives a request of termination of the programming mode from the external device 100. Alternatively, in the programming mode, in a case where the data is not received from the external device 100 for a certain period of time, the control unit 53 may terminate the process.

Advantageous Effects

As stated above, the relay device 50 according to the present embodiment transmits the data received from the external communication bus 60 to the in-vehicle communication bus, which is the transfer destination, in the order of reception. As compared with a case where the data is stored until all data is prepared for each of in-vehicle devices, the size of a storage area for temporary storage and costs can be reduced. Further, the required time can be reduced as compared with a case where all data is received for each of the in-vehicle devices and then transmitted to the in-vehicle device. Further, since the external device 100 according to the present embodiment can transmit the data addressed to the in-vehicle devices to the relay device 50 in parallel, the relay device 50 executes the programming of the in-vehicle devices in parallel. The data communication speed of the external communication bus 60 can be faster than the data communication speed of each of the in-vehicle communication buses 10 and 20, and the required time can be further reduced.

Additionally, even in a case where the relay device 50 cannot specify the in-vehicle communication bus which is the transfer destination based on the ID added to the data received from the external device 100, the data is transferred to all the in-vehicle communication buses, thus the data can be received by the in-vehicle device that is the destination. Therefore, even if there is an in-vehicle device for which the in-vehicle communication bus such an in-vehicle device is connected to is unknown, the programming for such an in-vehicle device is available.

Second Embodiment

Configuration

The configuration of the network system 1 according to the present embodiment is the same as that of the first embodiment, and descriptions thereof will be omitted. Hereinafter, differences from the first embodiment will be mainly described.

Sequence

Figure 5:
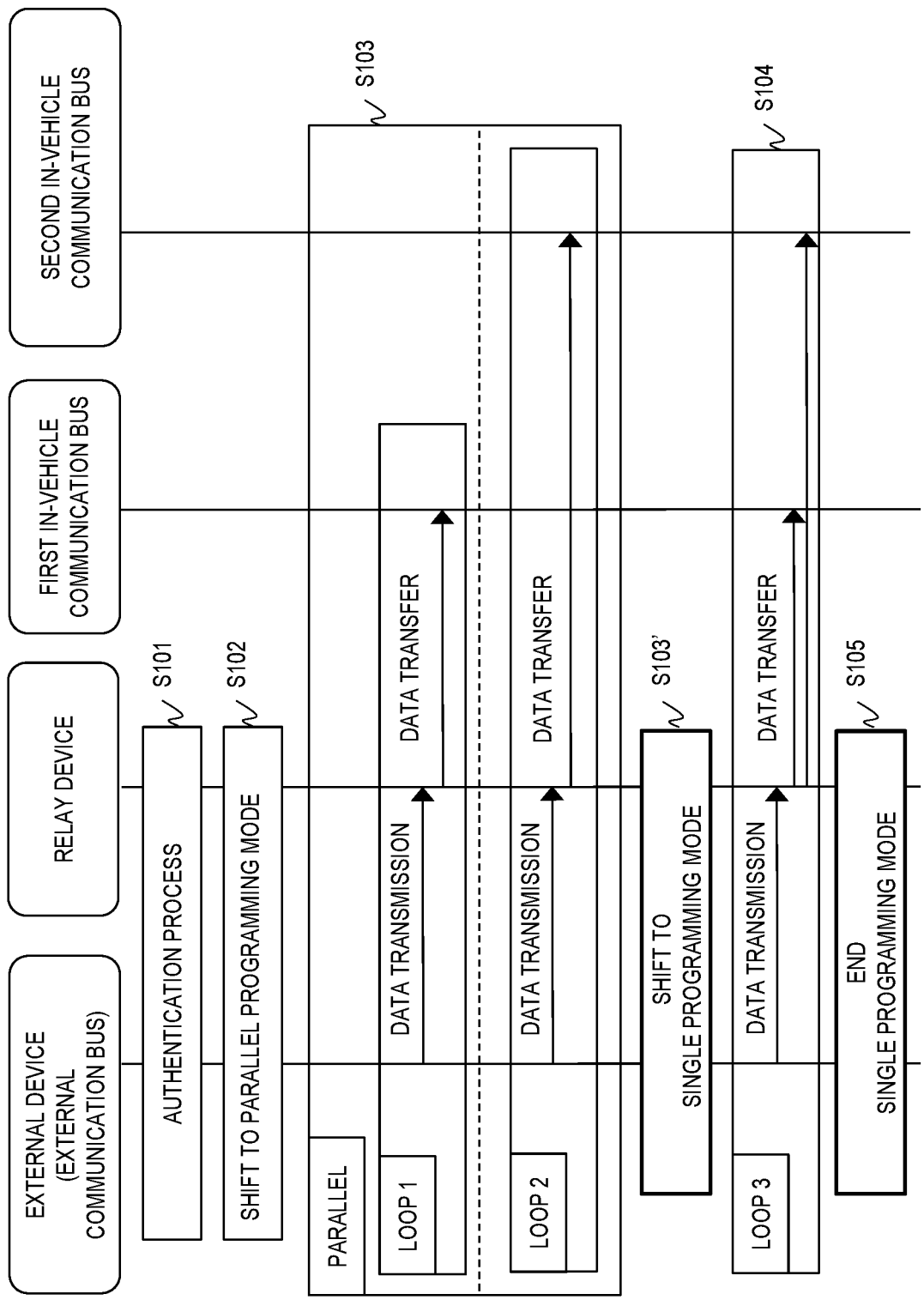
FIG. 5 is a sequence diagram illustrating a process according to the second embodiment of the present disclosure.

In the first embodiment, the in-vehicle devices are programmed in parallel, and thereafter, the single in-vehicle device is programmed in the programming mode. On the other hand, in the present embodiment, the parallel programming mode and the single programming mode are provided as operation states. In the parallel programming mode, the in-vehicle devices are programmed in parallel, and thereafter, the parallel programming mode is shifted to the single programming mode and the single in-vehicle device is programmed. In the single programming mode, the external device 100 transmits the data using the same protocol as the in-vehicle communication bus to which the target in-vehicle device is connected, thus it is possible to omit the data format conversion by the relay device 50. FIG. 5 shows a sequence diagram of this process. In FIG. 5, elements that are changed from the first embodiment are indicated by a frame with thick lines.

In the present embodiment, the programming for the in-vehicle devices is executed in parallel in step S103, and then the external device 100 and the relay device 50 shift to the single programming mode capable of executing programming for the single in-vehicle device in step S103'.

In step S104, the external device 100 generates and transmits the data using the same protocol as the protocol of the in-vehicle communication bus to which the in-vehicle device to be programmed is connected. In the illustrated example, the external device 100 uses the protocol of the second in-vehicle communication bus 20. The relay device 50 transmits the data received from the external communication bus 60 to each of the in-vehicle communication buses 10 and 20 without changing. In such a single programming mode, the external device 100 converts a format of the data to be transmitted using the external communication bus 60 so as to correspond to the protocol of the in-vehicle communication bus to which the single in-vehicle device to be programmed is connected, whereby the relay device 50 does not have to execute the data format conversion according to the protocol, and thus the processing load on the relay device 50 can be reduced. In the illustrated example, the data transmitted to each of the in-vehicle communication buses 10 and 20 is received by an in-vehicle device to be programmed, which is connected to the second in-vehicle communication bus 20.

In step S105, the external device 100 and the relay device 50 terminate the single programming mode when the in-vehicle devices to be programmed are completely programmed.

Process of External Device

Figure 6:
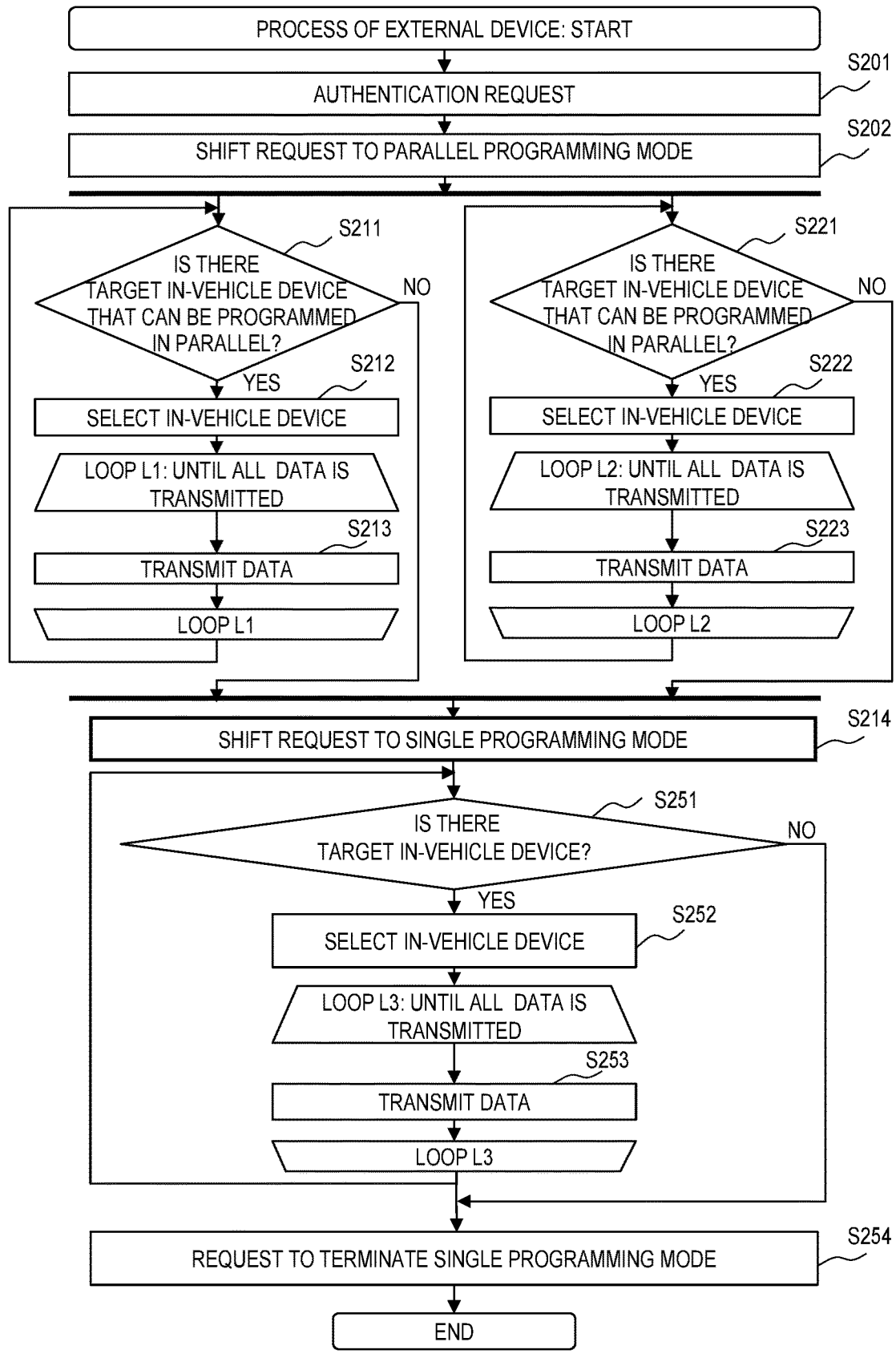
FIG. 6 is a flowchart illustrating a process according to the second embodiment of the present disclosure.

The process of the external device 100 in the sequence stated above will be described below. FIG. 6 shows a flowchart of this process. In FIG. 6, elements that are changed from the first embodiment are indicated by a frame with thick lines.

If there is no in-vehicle device capable of programming in parallel in step S211, the process proceeds to step S214. In step S214, the control unit 102 controls the communication unit 101 to communicate with the relay device 50 and issue a request to shift to the single programming mode, and also shifts the external device 100 to the single programming mode.

In step S253, the control unit 102 specifies the protocol of the in-vehicle communication bus to which the in-vehicle device selected in step S252 is connected, and causes the communication unit 101 to generate and transmit the data using the specified protocol. The control unit 102 executes this process based on, for example, information given in advance, which associates each in-vehicle device with the protocol of the in-vehicle communication bus to which each in-vehicle device is connected.

In step S254, the control unit 102 controls the communication unit 101 to communicate with the relay device 50 and issue a request to terminate the single programming mode, and also terminates the single programming mode of the external device 100.

Process of Relay Device

Figure 7:
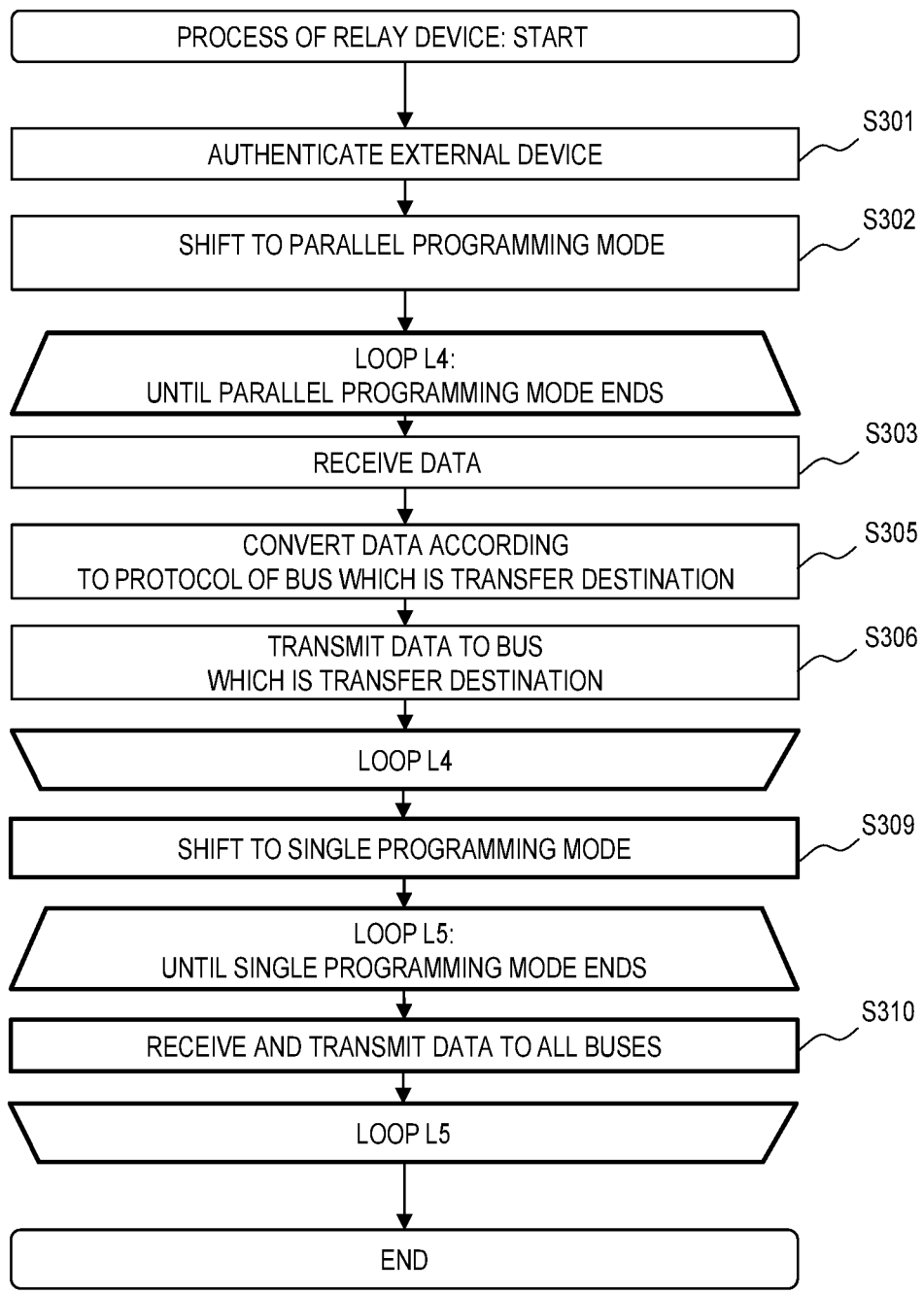
FIG. 7 is a flowchart illustrating a process according to the second embodiment of the present disclosure.

The process of the relay device 50 in the sequence stated above will be described below. FIG. 7 shows a flowchart of this process. Although not shown in FIG. 7, steps S304, S307, and S308 are omitted from the first embodiment. Other changed and added elements are represented by a frame with thick lines in FIG. 7.

In the present embodiment, transfer destinations for all pieces of the data received in step S303, which is the parallel programming mode, can be specified, each of the transfer destinations is the in-vehicle communication bus or the external communication bus, and the data is transmitted to the specified in-vehicle communication bus or the external communication bus. Therefore, the processes of steps S304, S307, and S308 are omitted. The loop of steps S303, S305, and S306 is repeated while the relay device 50 is in the parallel programming mode. In a case where the external communication unit 51 receives the request to shift to the single programming mode from the external device 100, the control unit 53 ends such a loop.

In step S309, the control unit 53 shifts to the single programming mode in response to the request to shift to the single programming mode from the external device 100.

In step S310, when the external communication unit 51 receives the data, the control unit 53 controls the in-vehicle communication unit 52 and the external communication unit 51 to transmit the received data to all the in-vehicle communication buses 10 and 20 and the external communication bus, without changing the data. If the in-vehicle communication bus which is the transfer destination can be specified based on, for example, the ID added to the received data, the data may be transmitted only to the specified in-vehicle communication bus.

The process of step S310 is repeated while the relay device 50 is in the single programming mode. The control unit 53 terminates the single programming mode in a case where the external communication unit 51 receives a request to terminate the single programming mode from the external device 100. Alternatively, in a case where the data is not received from the external device 100 for a certain period of time, the control unit 53 may terminate the single programming mode.

Advantageous Effects

Using the relay device 50 according to the present embodiment, the cost can be reduced and the time required for the programming process can be reduced, as in the first embodiment. Further, in the present embodiment, in the single programming mode, as described above, the relay device 50 does not have to execute the format conversion of the data according to the protocol, so that the processing load is reduced and the processing time is further reduced.

Third Embodiment

Configuration

The configuration of the network system 1 according to the present embodiment is the same as that of the first embodiment, and descriptions thereof will be omitted. Hereinafter, differences from the first embodiment will be mainly described. The present embodiment is obtained by adding step S102' to the first embodiment, but may be obtained by adding step S102' to the second embodiment.

Sequence

Figure 8:
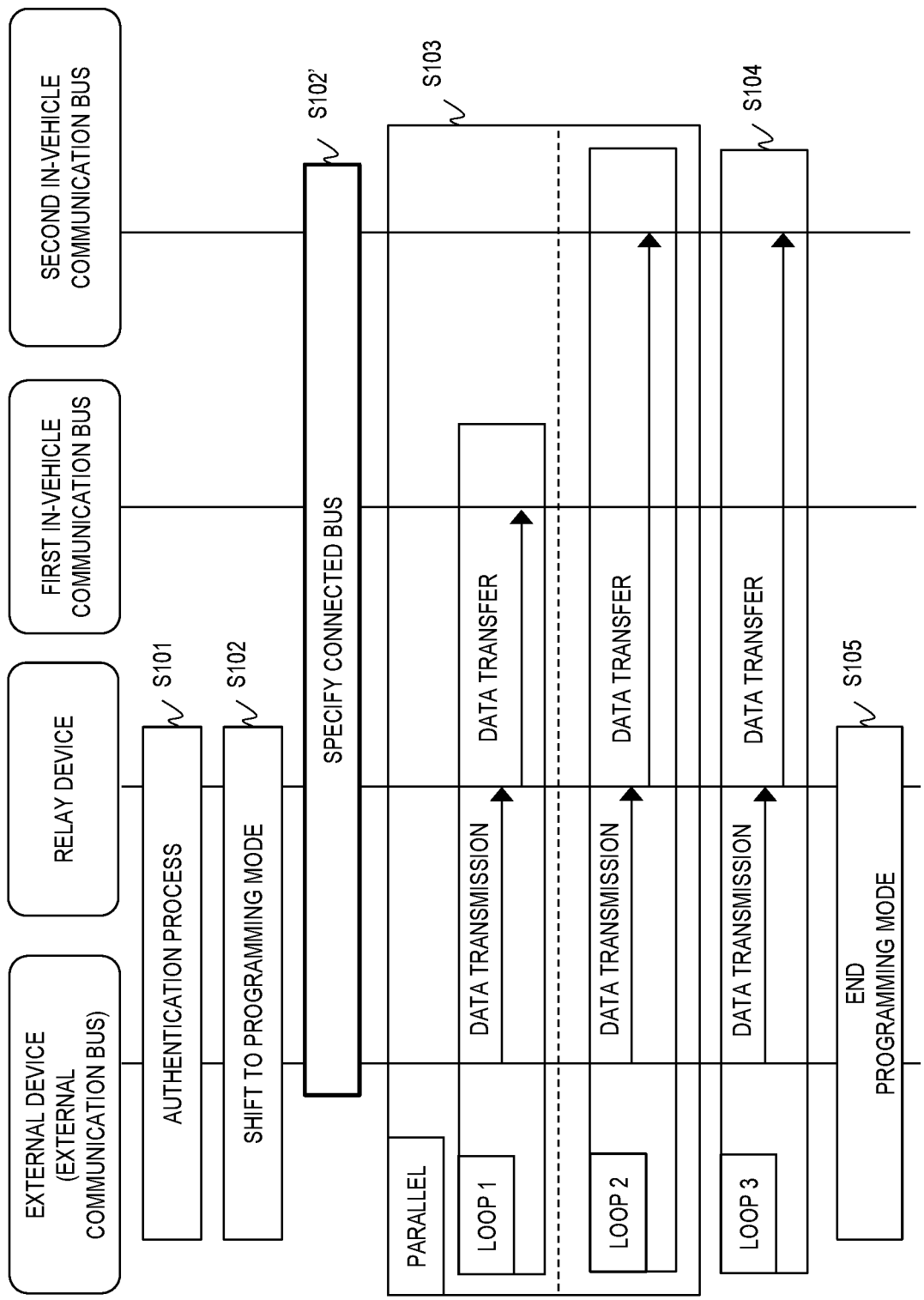
FIG. 8 is a sequence diagram illustrating a process according to the third embodiment of the present disclosure.

In the third embodiment, in the programming mode, the external device 100 acquires, from the relay device 50, information representing the in-vehicle communication bus to which the in-vehicle device to be programmed is connected before programming. The relay device 50 also generates such information based on actual communication with each in-vehicle device. Consequently, even if the in-vehicle communication bus to which each of the in-vehicle devices is connected is initially unknown, it is possible to accurately specify the in-vehicle communication bus to which the in-vehicle device is connected and suitably execute the parallel programming. FIG. 8 shows a sequence diagram of this process. In FIG. 8, elements that are changed from the first embodiment are indicated by a frame with thick lines.

In the present embodiment, after shifting to the programming mode in step S102, the in-vehicle communication bus to which each of the in-vehicle devices to be programmed is connected is specified in step S102'. The external device 100 and the relay device 50 execute the processes of steps S103 and S104 based on the specification result.

Process of External Device

Figure 9:
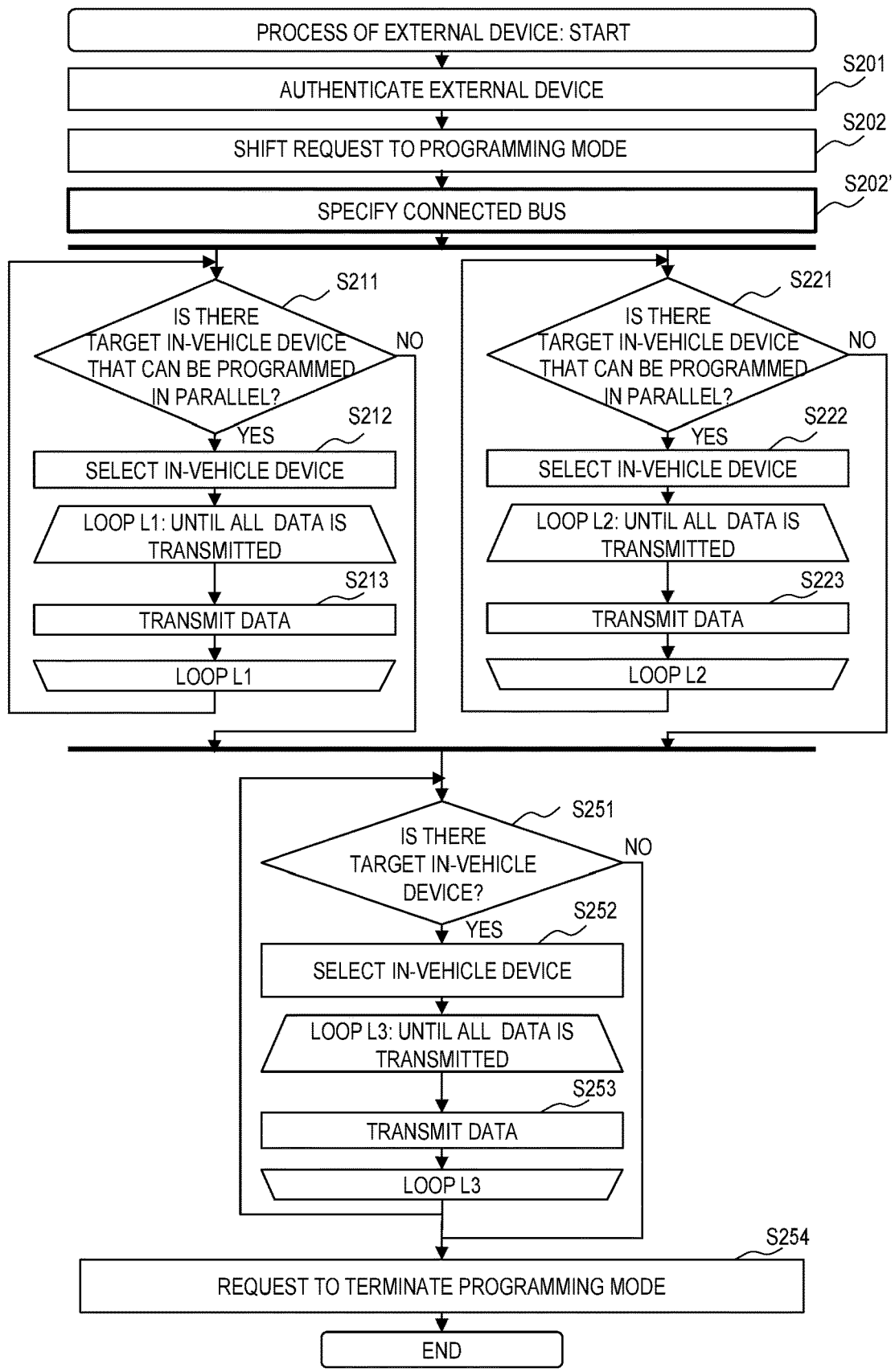
FIG. 9 is a flowchart illustrating a process according to the third embodiment of the present disclosure.
Figure 10:
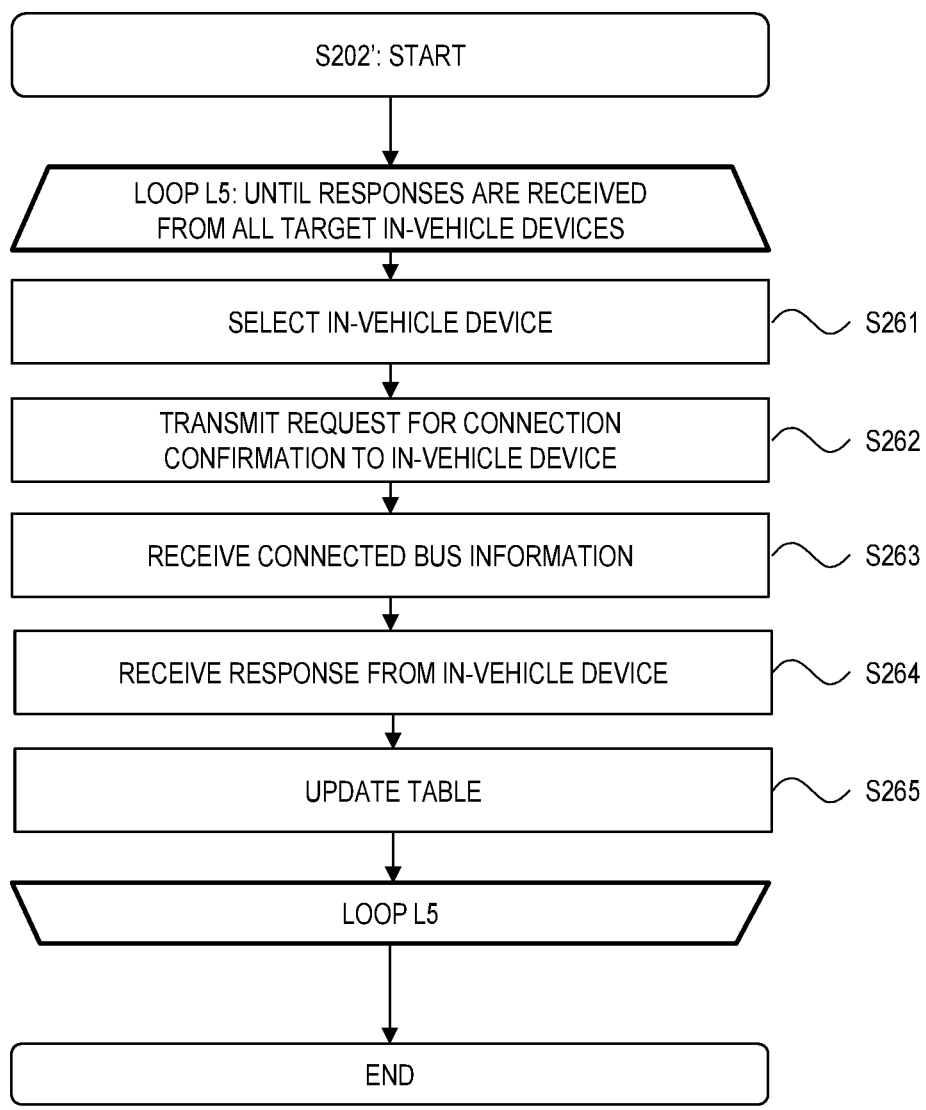
FIG. 10 is a flowchart illustrating a process according to the third embodiment of the present disclosure.

The process of the external device 100 in the sequence stated above will be described below. FIG. 9 shows a flowchart of this process. In FIG. 9, elements that are different from the first embodiment are indicated by a frame with thick lines. In the present embodiment, the connection bus specification process in step S202' is executed after step S202. FIG. 10 shows a flowchart of a process of step S202'. Hereinafter, the connection bus specification process will be described with reference to FIG. 10.

(Step S261): The control unit 102 of the external device 100 selects one of unselected devices from the in-vehicle devices to be programmed.

(Step S262): The control unit 102 causes the communication unit 101 to transmit the data representing a request for connection confirmation to the selected in-vehicle device. The ID (a request communication ID to be described later) that can specify the target in-vehicle device is added to the data.

(Step S263): The communication unit 101 receives, from the relay device 50, information representing the ID of the data transmitted in step S262, and the in-vehicle communication bus to which the in-vehicle device specified by the ID is connected.

(Step S264): The communication unit 101 receives, from the relay device 50, the data transmitted from the target in-vehicle device of the data transmitted in step S262 as the response of such data.

(Step S265): The control unit 102 updates a table as exemplified in Table 1 below based on the information received in step S263. In the table, the request communication ID is an ID added to data transmitted from the external device 100 to the in-vehicle device, and a response communication ID is an ID added to data transmitted from the in-vehicle device to the external device 100. The same ID does not correspond to different in-vehicle devices. Further, an ID generation rule is defined so that if either the request communication ID or the response communication ID can be specified, the other can also be specified for any one of the in-vehicle devices. In the example shown in Table 1, 8 is added to the request communication ID to obtain the response communication ID. In the table, for each of the in-vehicle devices, these IDs are associated with the in-vehicle communication bus to which the in-vehicle device specified by the IDs is connected and recorded. In this step, the in-vehicle communication bus to which the in-vehicle device selected in step S261 is connected is newly recorded.

TABLE 1

| In-vehicle Device | Request Communication ID (Hexadecimal) | Response Communication ID (Hexadecimal) | In-vehicle Communication Bus |
|---|---|---|---|
| In-vehicle device 11 | 0x750 | 0x758 | First in-vehicle communication bus 10 |
| In-vehicle device 12 | 0x760 | 0x768 | First in-vehicle communication bus 10 |
| In-vehicle device 21 | 0x722 | 0x72A | Second in-vehicle communication bus 20 |
| In-vehicle device 22 | 0x732 | 0x73A | Second in-vehicle communication bus 20 |
| ... | ... | ... | ... |

The processes of steps S261 to S265 are executed for all the in-vehicle devices to be programmed. Consequently, the table as shown in Table 1 is completed, and the processes in steps S211, S212, S221, S222, and S252 described above can be executed based on this table. The table is discarded when the programming mode ends, and is newly created every time the mode is shifted to the programming mode, so that the table can be used for other vehicles.

Process of Relay Device

Figure 11:
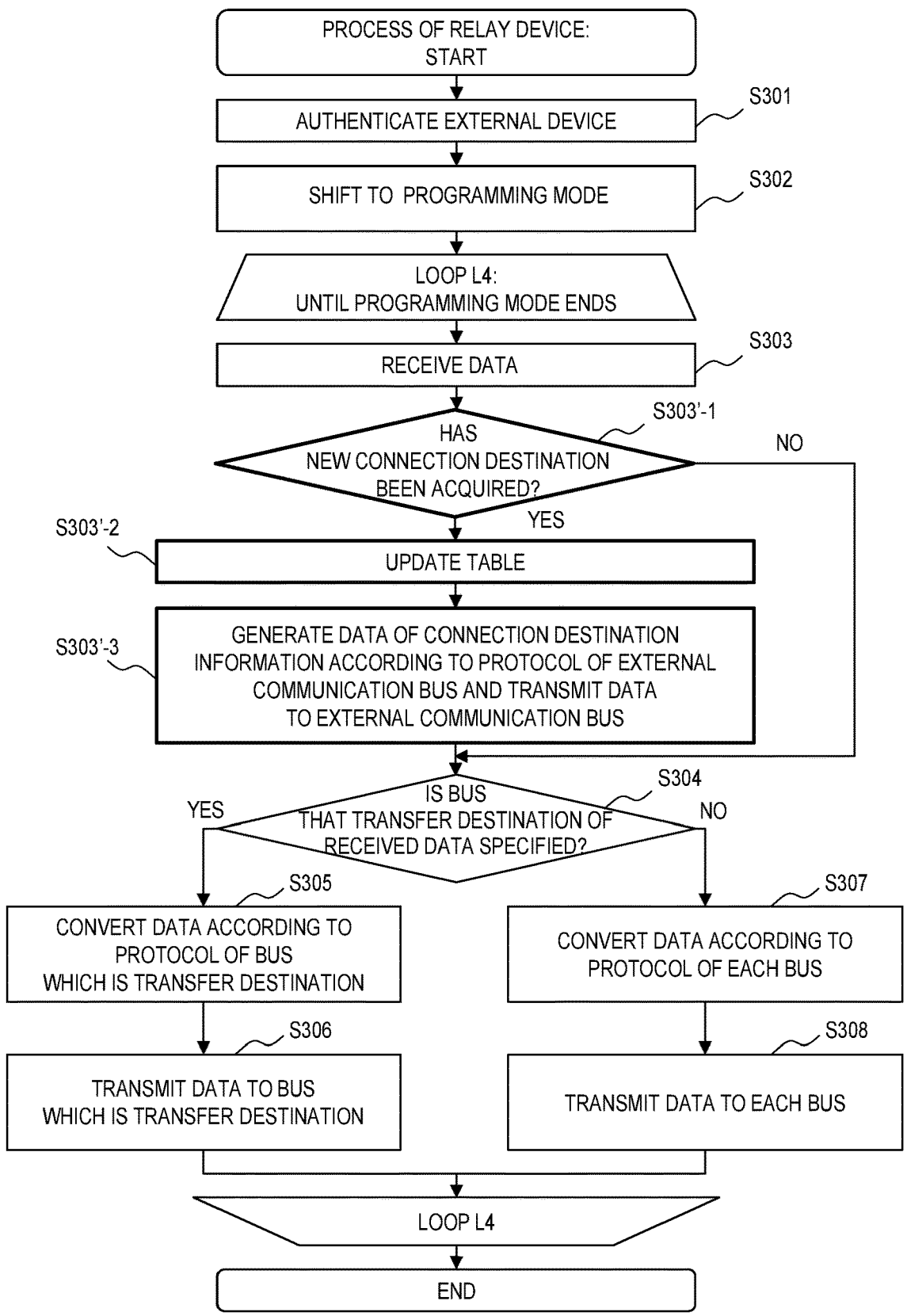
FIG. 11 is a flowchart illustrating a process according to the third embodiment of the present disclosure.

The process of the relay device 50 in the sequence stated above will be described below. FIG. 11 shows a flowchart of this process. In FIG. 11, elements that are changed from the first embodiment are indicated by a frame with thick lines.

In the present embodiment, the relay device 50 specifies the in-vehicle communication bus to which the in-vehicle device is connected, based on the response data received from each of the in-vehicle devices 11, 12, 21, and 22.

The process will be described focusing on the connection bus specification process, which is the feature of the present embodiment.

In the connection bus specification process, in step S303, the relay device 50 first receives, from the external device 100, the data representing the request for connection confirmation transmitted in step S262 described above. In this step, the control unit 53 does not determine in step S303'-1 that a new connection destination has been acquired, and proceeds to step S304.

In the relay device 50, the in-vehicle communication bus to which the in-vehicle device corresponding to the request communication ID is connected is initially unknown based on the request communication ID. Therefore, it is determined that the data representing the request for connection confirmation is not data to be transmitted to a specific in-vehicle communication bus in step S304, the processes in steps S307 and S308 are executed, and the data is transmitted to all the in-vehicle communication buses and external communication bus.

When the data representing the request for connection confirmation is received by the in-vehicle device, which is destination, connected to any one of the in-vehicle communication buses, the in-vehicle device transmits the response data addressed to the external device 100 to the relay device 50. The in-vehicle device adds the response communication ID to the response data.

Next, in step S303, the relay device 50 receives the response data.

By receiving the response data, the control unit 53 associates the response communication ID included in the response data with the in-vehicle communication bus that has received the response data. It is determined that the in-vehicle device that can be specified by the response communication ID has been newly connected to the in-vehicle communication bus in step S303'-1, and the process proceeds to step S303'-2.

The relay device 50 also has the table as shown in Table 1 described above, and in step S303'-2, the control unit 53 updates this table.

In step S303'-3, the control unit 53 generates the data of connection destination bus information including the information representing the request communication ID acquired from the response communication ID included in the response data and the in-vehicle communication bus that has received the response data, and causes the external communication unit 51 to transmit the ID to the external device 100.

The control unit 53 causes the external communication unit 51 to transmit the response data to the external device 100 through the processes of steps S304 to S308. Further, in a case where the bus that is the destination of the received data is specified by the processes of steps S304 to S308, regardless of whether or not it is determined that the in-vehicle communication bus to be newly connected has been acquired in step S303'-1, the data received via the in-vehicle communication bus in step S303 is transmitted to the destination device (that is, the external device 100 or the specific in-vehicle device) via the specified bus that is the transfer destination. In a case where the bus is not specified, the received data is transmitted to the in-vehicle device and the external device 100 via all the in-vehicle communication buses and the external communication bus. Consequently, the data transmitted from each of the in-vehicle devices 11, 12, 21, and 22 to the external device 100, including the response data and data other than the response data, is collectively transferred by the relay device 50 to the bus that is the transfer destination of the data, thus communication from the in-vehicle device to the in-vehicle device and communication to the external device 100 can be performed as needed.

When the processes stated above are repeated and the table is completely updated, the connection bus specification processing is completed. Thereafter, the data transmitted from the external device 100 is subjected to the determination using the table in step S304, and then the processes in steps S305 and S306 are executed. The table is discarded when the programming mode ends, and is newly created every time the mode is shifted to the programming mode, so that it is possible to deal with changes in the connection mode of the in-vehicle devices of the network system 1.

Advantageous Effects

In the relay device 50 according to the present embodiment, the cost can be reduced and the time required for the programming process can also be reduced as in the first embodiment. Further, in the present embodiment, even if the in-vehicle communication bus to which each of the in-vehicle devices is connected is unknown, it is possible to accurately specify the transfer destination and suitably execute the parallel programming.

As described above, several embodiments of the present disclosure have been described, but the features of each embodiment may be appropriately modified and combined for implementation. For example, the feature of the single programming mode of the second embodiment may be combined with the feature of the connection bus specification process of the third embodiment.

The present disclosure relates not only to the relay device and the external device, but also to the network system including the relay device, a system including the external device and the network system, a method executed by a computer included in the relay device and the external device, a program, a computer-readable non-transitory storage medium storing the program, a vehicle equipped with a network system, or the like. The present disclosure can be applied to network systems other than a network system mounted on a vehicle.

The present disclosure is useful for a network system mounted on a vehicle or the like.

What is claimed is:

1. A relay device configured to be connected to an external communication bus of a vehicle and to a plurality of in-vehicle communication buses to each of which at least one in-vehicle device is connectable, the relay device comprising: an external communication unit configured to communicate with an external device via the external communication bus; an in-vehicle communication unit configured to communicate with the in-vehicle device connected to each of the in-vehicle communication buses, via the in-vehicle communication buses; and a control unit configured to control the external communication unit and the in-vehicle communication unit, wherein: the external communication unit is configured to sequentially receive information for newly writing or updating a program of one of the in-vehicle devices, as a data sequence divided in a predetermined unit, or alternatively, sequentially receive pieces of information for newly writing or updating each of the programs of the in-vehicle devices, each of which is a data sequence divided in a predetermined unit and time-division multiplexed, from the external device; and the control unit is configured to control the in-vehicle communication unit such that the in-vehicle communication unit specifies the in-vehicle communication bus to be a transfer destination of the data in order of reception of the data by the external communication unit, converts the data according to a protocol corresponding to the in-vehicle communication bus which is the transfer destination, and sequentially transmits the converted data to the in-vehicle communication bus which is the transfer destination in order of conversion.

2. The relay device according to claim 1, wherein the control unit is configured to set a communication speed of the data to be faster in a case where the external communication unit receives the data than a communication speed of the data in a case where the in-vehicle communication unit transmits the data to each of the in-vehicle communication buses.

3. The relay device according to claim 1, wherein, in a case where it is not possible to specify the in-vehicle communication bus which is the transfer destination of the data, the control unit is configured to convert the data according to the protocol corresponding to each of the in-vehicle communication buses, and transmit the converted data to each of the in-vehicle communication buses.

4. The relay device according to claim 1, wherein, when the external communication unit receives, from the external device, a request for information specifying the in-vehicle communication bus to which the in-vehicle device is connected, the control unit is configured to control the external communication unit such that the external communication unit specifies the in-vehicle communication bus to which the in-vehicle device is connected and transmits information including a specifying result to the external device.

5. An external device that transmits to a relay device connected to an external communication bus and a plurality of in-vehicle communication buses to each of which one or more in-vehicle devices are connected, information for newly writing or updating a program of one of the in-vehicle devices, via the in-vehicle communication buses, the external device comprising:
a communication unit configured to communicate with the relay device;

a control unit configured to control the communication unit;

wherein the control unit is configured to execute first transmission control in which a data transmission process for controlling the communication unit is executed in parallel for the in-vehicle devices connected to different in-vehicle communication buses to time-division multiplex and transmit a plurality of data sequences, the data transmission process controlling the communication unit such that the communication unit sequentially transmits, to the relay device, the information for newly writing or updating the program of the in-vehicle device as the data sequence divided in a predetermined unit, and to execute second transmission control in which the data transmission process is executed for one of the in-vehicle devices.

6. The external device according to claim 5, wherein the control unit is configured to determine, based on predetermined information, whether to execute the first transmission control or the second transmission control for each of the in-vehicle devices for which the program is newly written or updated.

7. The external device according to claim 5, wherein the control unit is configured to determine, based on information specifying the in-vehicle communication bus to which each of the in-vehicle devices is connected, whether to execute the first transmission control or the second transmission control for each of the in-vehicle devices for which the program is newly written or updated.

8. The external device according to claim 7, wherein the control unit is configured to cause the communication unit to transmit, to the relay device, a request for information specifying the in-vehicle communication bus to which the in-vehicle device is connected, and to receive the information specifying the in-vehicle communication bus from the relay device.

9. The external device according to claim 5, wherein, when executing the second transmission control, each time the control unit causes the communication unit to transmit predetermined pieces of the data to the relay device, the control unit is configured to cease transmission of the data until the communication unit receives a response from the relay device.

10. The external device according to claim 5, wherein, when executing the second transmission control, the control unit is configured to set a communication speed of the data by the communication unit, to be slower than when executing the first transmission control.

11. The external device according to claim 5, wherein, in a case where the first transmission control is possible, the control unit is configured to execute the first transmission control with higher priority than the second transmission control.

* * * * *